Oct. 13, 1931.    M. R. SHIPLEY    1,827,266

VALVE BODY

Filed Sept. 20, 1928

INVENTOR

Marion R. Shipley

Patented Oct. 13, 1931

1,827,266

UNITED STATES PATENT OFFICE

MARION R. SHIPLEY, OF HERMOSA BEACH, CALIFORNIA, ASSIGNOR TO A. H. SHIPLEY, OF FRESNO, CALIFORNIA

VALVE BODY

Application filed September 20, 1928. Serial No. 307,312.

The present invention relates to hollow fluid-conveying and pressure resisting bodies such as valve bodies, and has for its main object the provision of suitable internal linings and surfaces for same.

In the case of valve bodies for example, the pressure encountered or the cost of material, or both, require that the body be composed of a strong but inexpensive material such as iron, whereas the internal surfaces are best provided by some other metal or material such as brass, babbitt, lead, asbestos, fibre or the like. In plug valve parts of the inner surfaces must be accurately machined and maintained. In other valves the body must be strong while the inner surfaces are best provided by some acid resisting material, often of low tensile strength.

Ordinary valve linings have several recognized objections among which is the tendency for the lining to buckle or otherwise separate from the body to result in leakage and other inefficiencies.

Another and important object of my invention is to provide a lined valve body in which the major stresses and strains are taken directly by the valve body; which may be of low cost, while the lining, which may be a limited quantity of more expensive material is not subjected to such strains, and so incorporated in the body as to prevent leakage.

Other objects and advantages of my invention will appear hereinafter and will be better understood by reason of the order in which they appear.

Figure 1:
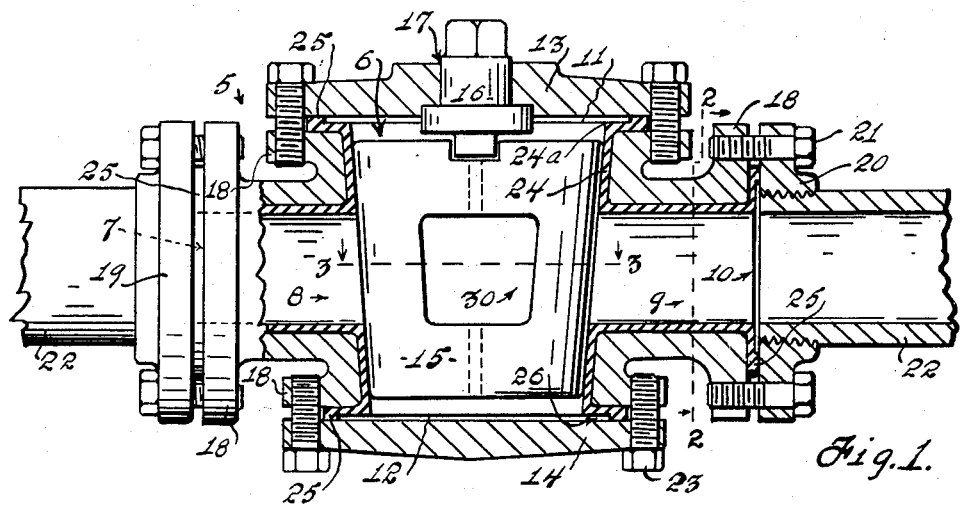
Figure 2:
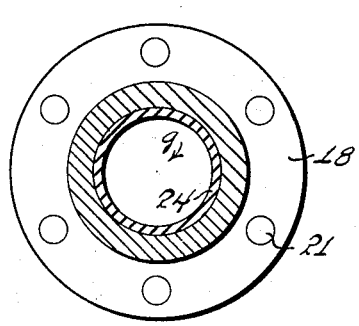
Figure 3:
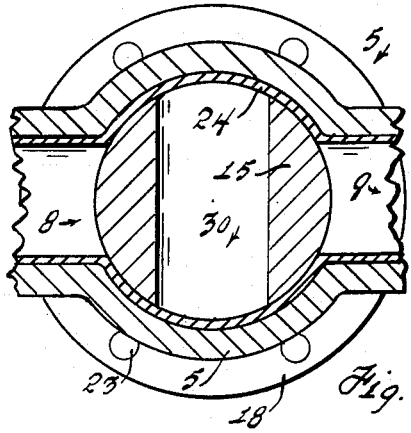
Figure 4:
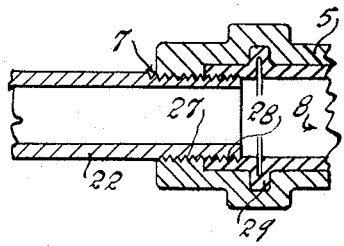

I have illustrated my invention by the accompanying drawings in which Figure 1 is a view in vertical section of a common type of valve body to which my invention is applied. Figure 2 is a similar view on smaller scale of the complete valve. Figure 3 is a cross section thereof. Figure 4 is a fragmentary view of a modification.

The valve body 5 shown in Figs. 1, 2 and 3, is provided with an internal cavity 6, an inlet opening 7, an inlet fluid course 8 leading from the opening 7 to the cavity 6, and an outlet fluid course 9 leading from the cavity to an outlet opening 10. The cavity 6 is open at each end as at 11 and 12 respectively; said openings being normally closed by flanges or closures 13 and 14 respectively. The complete valve includes a turning plug 15 and a key 16 for moving the plug; said key passing out thru an opening 17 in the top closure 13.

For each of the openings 7, 10, 11 and 12 respectively the body provides a corresponding encompassing flange 18, 18, 18, 18. To certain of these flanges, pipe flanges 19 and 20 respectively are attached as by bolts 21. In this manner the valve may be incorporated in a fluid line between two pipes 22, 22. The top and bottom closures are each attached to the corresponding body flange, also by bolts 23.

Where the valve lining is formed of metal such as brass, babbitt or lead, the valve chamber lining 24 is produced or constructed separate from those portions of the lining that extend through the fluid courses 8 and 9 and when the three parts of the lining are assembled in the valve housing, the inner ends of the linings for the fluid courses are integrally connected to the valve chamber lining 24 by being electrically or otherwise welded or by being soldered and the rough edges of the joints afterwards smoothed and polished.

The construction features so far described for the valve illustrated, and the means for attaching same to pipe lines is well understood in the art. The salient feature of my invention resides in the lining 24 which is co-extensive of all internal surfaces of the valve body. At each flange 18, the lining extends out from the corresponding opening and turns as at 24a into contiguity with the corresponding flange. At each flange at a point outwardly of the bend 24a, the lining is thickened as at 25 to provide an annular integral gasket within the circle of the corresponding bolts.

Each pipe flange or closure, when attached to the corresponding body flange holds the gasket between it and the corresponding body flange. Thus the gasket not only serves to prevent leakage from the cavity and fluid courses to the atmosphere, but each gasket also acts to hold the lining anchored in place and to prevent fluid from finding its way between body and lining.

When the body cavity or fluid courses, or any of them, are subject to fluid pressure, or to fluid which may have chemical action on the body, all such fluid, from the time it leaves the inlet pipe is in contact only with the lining and never with the body or even with the bolts holding the flanges to the body.

Actually, each pipe is by means of its flange attached directly to the valve body insofar as stresses are concerned altho the pipe is actually and directly in fluid communication with the lining only. The strains set up by the bolts are entirely between the flanges and are not imposed on any parts of the lining except the gaskets. Vertical stresses imposed by the upper and lower closures cannot buckle that part of the lining on which the plug works, particularly since the lining will readily bend at 24a without transmitting the strains any farther. It is this comparatively flexible connection between the major part of the lining and gaskets that relieves the major part of the lining from strain. The bent portions 24a also take care of expansion of the lining, particularly since a space 26 is left between the bend 24a and the corresponding gasket or closure.

In the modification shown in Fig. 4, the flanges are not employed and instead the body is provided with internal threads 27 at each opening such as at the inlet opening. The lining terminates within the body near each threaded portion 27 and is also provided with threads 28. Thus a pipe 28 may be threaded to the valve body and at the same time be in fluid tight connection with the lining. Stresses are taken up by annularly disposed U bends 29 in the lining.

The invention is not limited to valves and shall embrace any application or construction coming within the scope of the appended claims.

I claim:

1. In a valve, a housing having a valve chamber, both ends of which are open, there being inlet and outlet passages formed in the valve housing and communicating with the valve chamber therein, a one piece lining for the chamber in the valve housing, which lining extends through the inlet and outlet openings, portions of said lining being extended around the outer ends of said inlet and outlet openings to form flanges, portions of which flanges are increased in thickness to form gaskets, portions of the lining being extended around the openings at the ends of the valve chamber within the housing to form flanges, portions of which flanges are increased in thickness to form gaskets and closures secured to the ends of the valve housing and bearing on said last mentioned gaskets.

2. The combination with a valve housing having a valve chamber and a plurality of openings communicating with said valve chamber, of a one piece lining for said valve chamber, portions of which lining are extended to form flanges that surround the outer ends of the openings in said valve housing and portions of which flanges are increased in thickness to form gaskets that are adapted to be engaged by parts that are secured to the valve housing.

MARION R. SHIPLEY.